UNITED STATES PATENT OFFICE.

JOHN SCOTT, JR., AND AMOS S. SCOTT, OF COATESVILLE, PENNSYLVANIA.

IMPROVEMENT IN WELDING COMPOUNDS.

Specification forming part of Letters Patent No. 166,816, dated August 17, 1875; application filed July 17, 1875.

*To all whom it may concern:*

Be it known that we, JOHN SCOTT, Jr., and AMOS S. SCOTT, of Coatesville, in the county of Chester and State of Pennsylvania, have invented a new and Improved Welding Compound, of which the following is a specification:

The object of our invention is to produce an improved welding compound to be used in the manufacture of iron and steel; and it consists of a mixture of kaolin and sand in suitable proportions.

We have found, by actual tests, that one part of kaolin to two parts of sand produce a welding compound of superior quality, but we do not bind ourselves to the exact proportion given, as the same may be varied from according to the different applications of the compound. The materials have to be used in as pure a state as possible to give the effect desired.

Having thus described our invention, what we claim as new, and desire to secure by Letters Patent, is—

The welding compound described, consisting of kaolin and sand, substantially in the manner and for the purpose set forth.

JOHN SCOTT, JR.
AMOS S. SCOTT.

Witnesses:
ANNIE P. LEWIS,
JOHN SCOTT, Sr.